United States Patent [19]

Kerwin

[11] 4,369,082

[45] Jan. 18, 1983

[54] METHOD AND APPARATUS FOR APPLYING DECALS TO ARTICLES

[75] Inventor: Daniel Kerwin, Lombard, Ill.

[73] Assignee: The Meyercord Co., Carol Stream, Ill.

[21] Appl. No.: 277,696

[22] Filed: Jun. 26, 1981

Related U.S. Application Data

[62] Division of Ser. No. 166,818, Jul. 8, 1980, abandoned.

[51] Int. Cl.[3] .............................................. B32B 31/00

[52] U.S. Cl. .................................... 156/238; 156/240; 156/361; 156/542; 156/541; 156/358; 156/368; 101/34

[58] Field of Search ............... 156/542, 541, 540, 230, 156/234, 233, 240, 249, 273, 277, 289, 238, DIG. 11, DIG. 13, 361, 384, 458, 358, 368, 363, 582; 101/34, 33, 177, 129, DIG. 4

[56] References Cited

U.S. PATENT DOCUMENTS 3,943,023 3/1976 Weingrad ............................ 156/540
3,970,506 7/1976 Kwan et al. ......................... 156/358
4,175,993 11/1979 Robertson ........................... 156/234
4,214,937 7/1980 Geurtsen et al. ................... 156/542
4,239,570 12/1980 Kerwin .............................. 156/238
4,242,167 12/1980 Hoffman ............................ 156/357

*Primary Examiner*—Edward C. Kimlin
*Assistant Examiner*—Louis Falasco
*Attorney, Agent, or Firm*—Merriam, Marshall & Bicknell

[57] ABSTRACT

This disclosure relates to a method and machine for applying a decal to a generally cylindrical article, particularly an article having a handle on one side thereof. A series of decals are attached to an elongated web and are spaced a generally constant distance apart in the direction of the length of the web. The machine includes supply and takeup spindles for rotatably supporting reels for the web, and a web drive for moving the web from the supply reel to the take-up reel. A mandrel rotatably supports the article and a movable head presses the web and the decal against an article on the mandrel. The web passes from the supply reel, between the mandrel and the head, and to the take-up reel. The machine further includes a brake which, when engaged, holds the web against movement, and a decal sensor assembly. After the machine is actuated to cause the movable head to press the decal against an article, the brake is actuated to release the web, and the web is then pulled across the article. The moving web rotates the head which in turn engages and rotates the mandrel. The article revolves with the mandrel and the decal is rolled onto the article. The decal sensor assembly controls the operation of the brake to enable advance of the web during and after application of each decal.

4 Claims, 8 Drawing Figures

| | HEAD UP START CYCLE | HEAD ARRIVES DOWN/START APPLICATION | HEAD DOWN END APPLICATION | HEAD ARRIVES UP | HEAD UP END CYCLE |
|---|---|---|---|---|---|
| START OPERATION SWITCH 134 | CLOSED | OPEN | OPEN | OPEN | OPEN |
| SWITCH 138 | OPEN | CLOSED | CLOSED | OPEN | OPEN |
| SWITCH 149 | OPEN | CLOSED | CLOSED | OPEN | OPEN |
| SWITCH 151 | CLOSED | OPEN | OPEN | CLOSED | CLOSED |
| CELL 132 | SET | RESET | RESET | RESET | SET |
| CONTACTS 132A | CLOSED | OPEN | OPEN | OPEN | CLOSED |
| CONTACTS 132B | CLOSED | OPEN | OPEN | OPEN | CLOSED |
| CELL 133 | RESET | RESET | SET | RESET | RESET |
| CONTACTS 133A | CLOSED | CLOSED | OPEN | CLOSED | CLOSED |
| CONTACTS 133B | OPEN | OPEN | CLOSED | OPEN | OPEN |
| TIMER CONTACTS T-1&T-2 | OPEN | CLOSED | OPEN | OPEN | OPEN |
| | 156 | 157 | 158 | 159 | 160 |

FIG. 8

| | HEAD UP START CYCLE | HEAD ARRIVES DOWN/START APPLICATION | HEAD DOWN END APPLICATION | HEAD ARRIVES UP | HEAD UP END CYCLE |
|---|---|---|---|---|---|
| START OPERATION SWITCH 134 | CLOSED | OPEN | OPEN | OPEN | OPEN |
| SWITCH 138 | OPEN | CLOSED | CLOSED | OPEN | OPEN |
| SWITCH 149 | OPEN | CLOSED | CLOSED | OPEN | OPEN |
| SWITCH 151 | CLOSED | OPEN | OPEN | CLOSED | CLOSED |
| CELL 132 | SET | RESET | RESET | RESET | SET |
| CONTACTS 132A | CLOSED | OPEN | OPEN | OPEN | CLOSED |
| CONTACTS 132B | CLOSED | OPEN | OPEN | OPEN | CLOSED |
| CELL 133 | RESET | RESET | SET | RESET | RESET |
| CONTACTS 133A | CLOSED | CLOSED | OPEN | CLOSED | CLOSED |
| CONTACTS 133B | OPEN | OPEN | CLOSED | OPEN | OPEN |
| TIMER CONTACTS T-1 & T-2 | OPEN | CLOSED | OPEN | OPEN | OPEN |
| | 156 | 157 | 158 | 159 | 160 |

METHOD AND APPARATUS FOR APPLYING DECALS TO ARTICLES

This is a division of application Ser. No. 166,818, filed July 8, 1980, now abandoned.

Kerwin U.S. Pat. No. 3,813,268 discloses a machine for applying indicia, such as decals, to generally cylindrical articles such as glasses. The decals are carried by an elongated web or strip of backing material, and the web is passed between an article support and a die. The die is curved and it folds the decal across one side of the article when the die is moved against the article. Brakes and a photocell sensor control the advance of the web through the machine as the decals are applied to successive articles.

While the machine disclosed in this Kerwin patent works well and has been commercially successful, its use has been limited to applying relatively short decals to one side only of a generally cylindrical article. Further, the machine shown in the patent is not readily suited for use in applying a decal to an article having a handle on one side, such as a mug, where the decal must be accurately located relative to a handle of the mug.

It is therefore a general object of this invention to provide a novel and improved machine that overcomes the foregoing deficiencies.

A method and machine in accordance with this invention is designed for use with an elongated web having a plurality of decals thereon at generally regularly spaced intervals. The machine includes means for supporting web supply and take-up reels for the web, means forming a web transport path from the supply reel to the take-up reel and drive means for moving the web to the take-up reel. The machine further includes a mandrel for rotatably supporting an article and a pressure roller, the web being passed between the roller and the mandrel, a brake for clamping and holding the web, and decal sensor means for controlling operation of the brake. The roller presses the web against the article, the brake is released, and the drive means moves the web causing the pressure roller and the article to rotate due to the web movement, and the decal is rolled onto the article. The decal sensor means controls the operation of the brake in order to start and stop the movement of the web, and to accurately locate the next subsequent decal after each application.

Other objects, features and advantages of the present invention will be apparent from the following detailed description taken in conjunction with the accompanying figures of the drawings which, by way of a preferred example only, illustrates an embodiment of the invention, wherein FIG. 1 is a front view of a machine embodying the present invention:

FIG. 8 is a chart showing the operation of the control system and the machine.

While the following detailed description includes references to the locations of parts relative to other parts in a figure of the drawings, such as above or below, it will be understood that such references are used herein only to facilitate the description of the parts, since the apparatus described may have various orientations before and during use.

Further, although the method and apparatus in accordance with the present invention is especially adapted for applying decals to generally cylindrical articles having handles, such as a mug, it will be understood that the apparatus also has other uses and that the invention is not limited to any particular use. For example, the apparatus may be used to apply labels carried by a long web rather than decals, and the articles may not include a handle and may be somewhat tapered instead of generally cylindrical.

Figure 1:
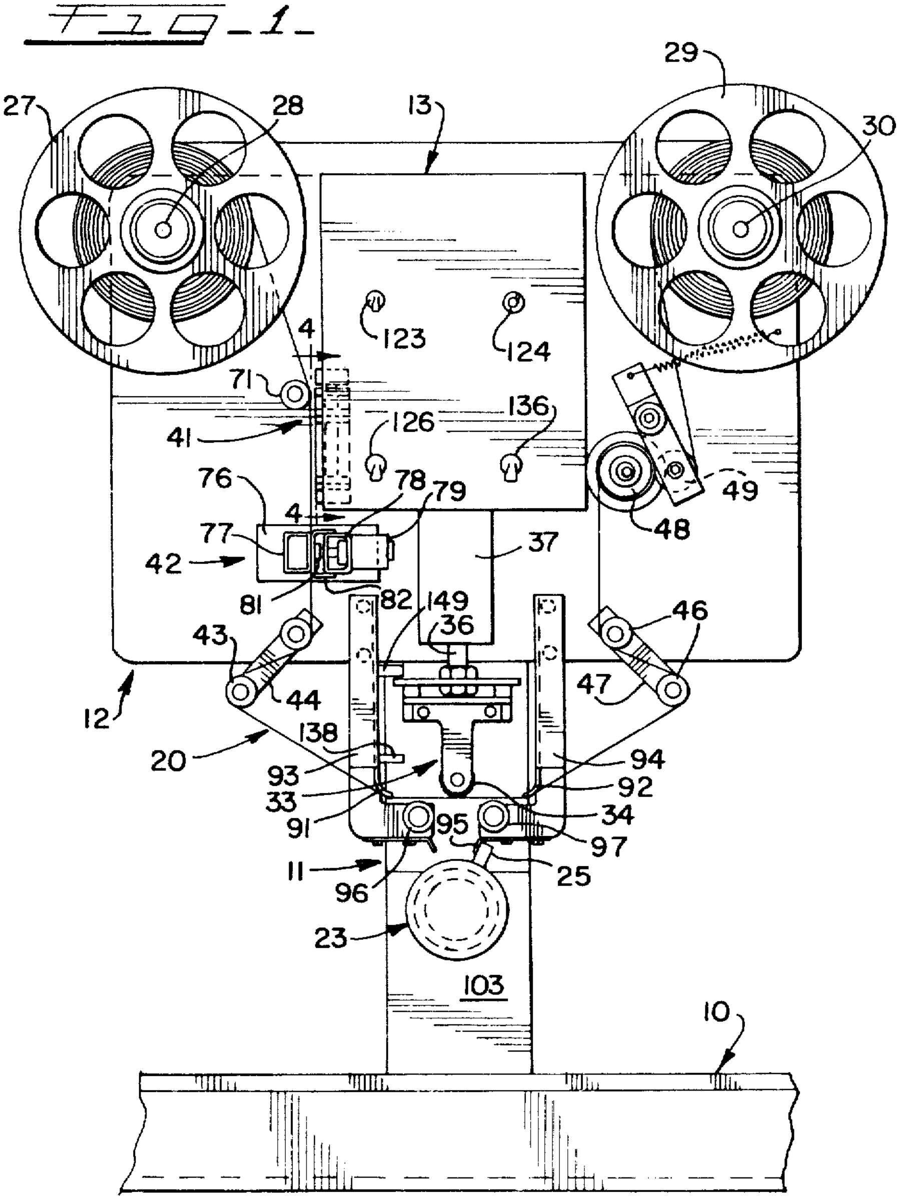
Figure 2:
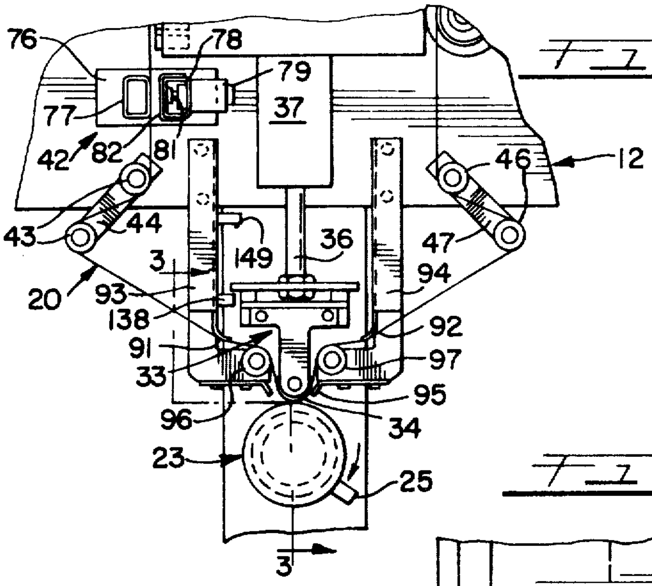
FIG. 2 is a fragmentary view of a part of the machine showing another position of some of the parts.

With reference to FIGS. 1 and 2 of the drawings, the apparatus includes a base 10 that has fastened thereto a vertically extending support post 11. At the upper end of the support post 11 is fastened a generally rectangular mounting plate 12 which supports most of the operating mechanisms and the control circuitry of the machine. A control box and panel 13 are mounted at approximately the center section of the mounting plate 12 and houses the control circuitry illustrated in FIG. 7.

Figure 6:
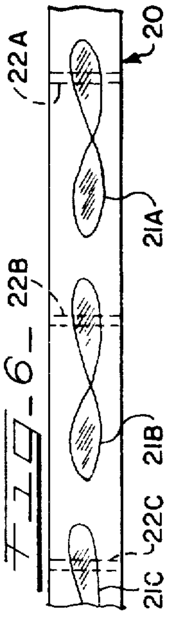
FIG. 6 is an illustration of a web carrying decals, that may be used in the machine.

As mentioned, the apparatus is particularly designed to transfer decals from an elongated web to a ware or article. With reference to FIGS. 1, 2 and 6, the elongated web is indicated by the reference numeral 20 and a series of decals 21 on the web are indicated by the reference numerals 21A, 21B and 21C. The decals are releasably formed on one side of the web 20 and may be conventional heat-release decals. A series of marks 22 are formed on the other or backside of the web and are indicated by the numerals 22A, 22B and 22C, one mark being associated with each decal.

Figure 3:
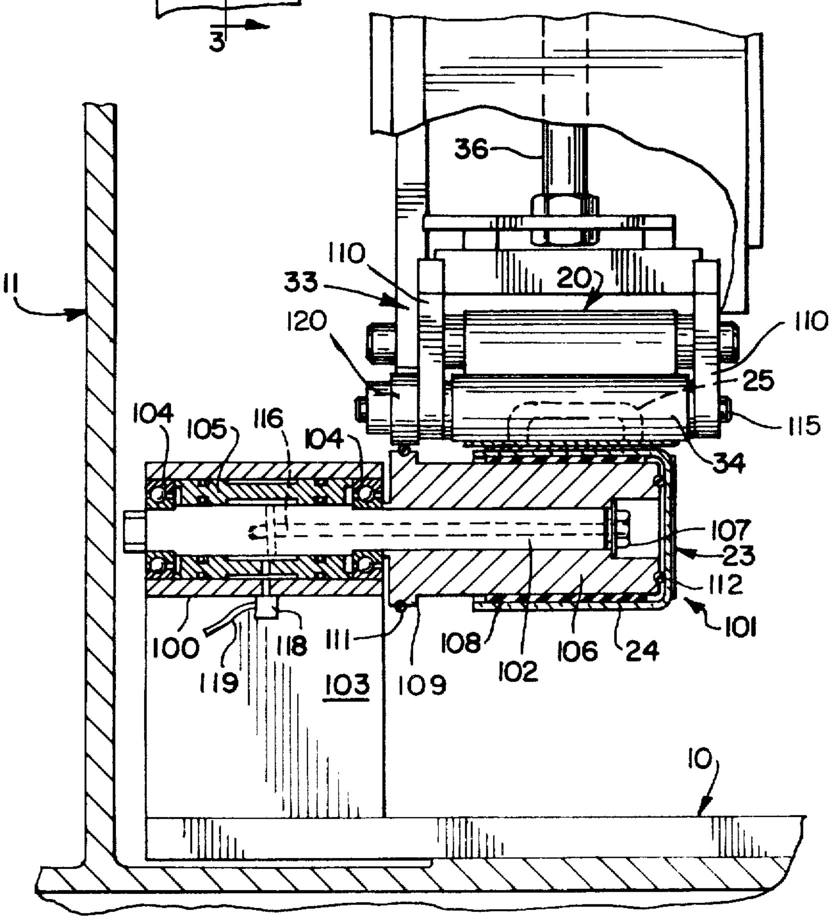
FIG. 3 is a fragmentary enlarged view taken on the line 3—3 of FIG. 2.

As mentioned, the machine transfers each decal from the web to a ware and in the present specific example illustrated in the drawings, the ware consists of a mug 23 having a generally cylindrical outer wall surface 24 and a handle 25 that extends radially outwardly from one side of the surface 24, as best shown in FIGS. 1 and 3. The length of each decal 21 is less than the outer circumference of the outer mug surface 24, and as will be described hereafter, the decal is rolled onto the surface 24 from one side of the handle 25 to the other side of the handle.

After manufacture of the web 20 and the decals 21 thereon, the web is wound on a feed or suply reel 27 (FIG. 1) which is rotatably mounted on a supply spindle 28 of the present machine. The supply spindle 28 is mounted in the upper left-hand corner of the plate 12 as seen in FIG. 1, and the supply spindle is preferably connected to an electric motor as will be described hereinafter in connection with the control circuit of FIG. 7. From the supply reel 27 the web 20 extends along a web transport path to a take-up or rewind reel 29 that is rotatably mounted on a take-up spindle 30. The spindle 30 is mounted in the upper right-hand corner as seen in FIG. 1 of the plate 12 and another motor, shown in FIG. 7 and to be described hereinafter, is connected to turn the take-up spindle 30 in order to wind the web 20 onto the take-up reel 29.

The web transport path carries or conducts the web 20 between the ware 23 and a vertically movable head 33. As is best shown in FIGS. 1 and 2, the head 33 has the configuration of the letter "T" and a pressure roller 34 is rotatably mounted at the lower end of the vertical or center post of the "T". The axis of the roller 34 is parallel to the surface 24 (FIG. 3) and its length is approximately equal to the width of the web 20 but less than the height of the surface 24. The cross member or top bar of the T-shaped head 33 is fastened to the lower end of a piston rod 36 of an air cylinder 37. The air cylinder 37 is controlled by a solenoid-operated valve (FIG. 7) such that, when the solenoid is energized, the piston rod 36 and the head 33 are moved downwardly to the down or lower position shown in FIG. 2. When the solenoid is not energized, the piston rod 36 and the head 33 are retracted to their upper position illustrated in FIG. 1.

Figure 5:
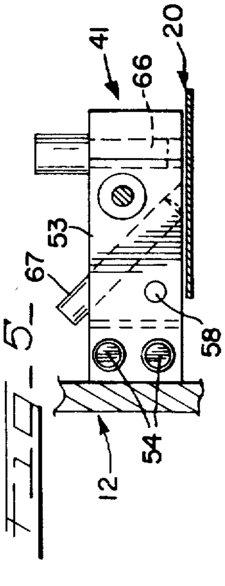
FIG. 5 is a fragmentary view taken on the line 5—5 of FIG. 4.
Figure 4:
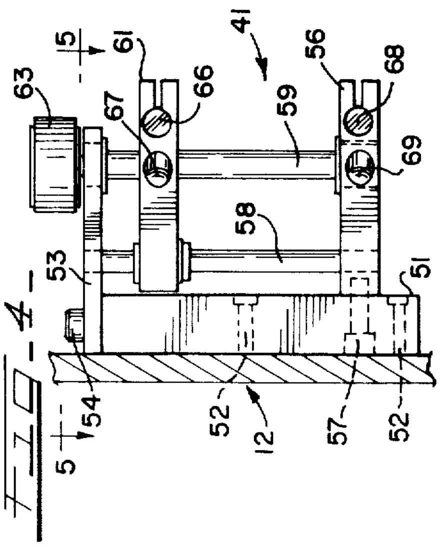
FIG. 4 is a fragmentary enlarged view taken on the line 4—4 of FIG. 1.

The transport path for the web 20 further carries the web past a sensor assembly 41 which responds to the dark marks 22 shown in FIG. 6, the sensor assembly 41 being better illustrated in FIGS. 4 and 5, past a web brake 42, past a first pair of idler rollers 43 that are mounted on an arm 44, across the head 33, past a second pair of idler rollers 46 that are mounted on a second arm 47, past a drive roller 48 and pressure roller 49, and to the take-up reel 29.

With reference to FIGS. 4 and 5, the sensor assembly 41 comprises a bracket 51 that is fastened to the mounting plate 12 by a plurality of mounting screws 52. Secured to and extending forwardly from the bracket 51 are a mounting arm 53 that is fastened to the upper end of the bracket 51 by screws 54, and a lower photocell support or housing 56 that is secured to the lower end of the bracket 51 by mounting screws 57. Extending vertically between the lower housing 56 and the arm 53 are a guidepost 58 and an adjusting post 59. The post 58 is secured at its ends to the housing 56 and the arm 53, whereas the adjusting post 59 is rotatably mounted on the housing 56 and on the outer end of the arm 53. An upper photocell housing 61 is threadedly connected to the adjusting post 59 and slidably connected to the guidepost 58. At the upper end of the adjusting post 59 is secured a knob 63 which may be manually turned in order to rotate the post 59. While the post 59 is able to rotate, it cannot move vertically with respect to the housing 56 and the arm 53. It will be apparent from the foregoing that while the lower photocell housing 56 is fixed in place, the position of the upper photocell housing 61 may be vertically adjusted relative to the lower photocell housing by turning the knob 63 and the adjusting post 59, such turning causing the upper photocell housing 61 to be screwed upwardly or downwardly depending upon the direction of rotation of the post 59. The guidepost 58, of course, holds the upper photocell housing 61 substantially parallel during such adjustment of the position of the housing 61.

The upper photocell housing 61 supports an upper photocell or sensor 66 and a light source 67, and the lower photocell housing 56 supports a lower photocell or sensor 68 and a lower light source 69.

As best shown in FIG. 1, the web 20 is moved closely adjacent the sensor assembly 41 by an idler roller 71 which is spaced closely adjacent the photocell housings 56 and 61. The side of the web 20 which faces the photocell sensors 66 and 68 contains the dark marks 22. With reference to FIG. 5, the light source 67, for example, directs light toward the web 20 and in the absence of a dark mark, some of the light is reflected toward and received by the upper photocell 66. However, when a dark mark 22 crosses the light path, the light is absorbed and not reflected, and the absence of reflected light caused by the presence of the dark mark is sensed by the photocell 66. The lower light source 69 and photocell sensor 68, of course, operate similarly. The sensor assembly 41 is located relative to the decals 21 and the marks 22 so that the forward edge of a decal 21 is adjacent the pressure roller 34 when the head 33 is down as shown in FIG. 2 and when a mark 22 is adjacent the lower cell 68.

Since a mark 22 is associated with each decal 21 and since the sensors could be arranged to respond to the decals instead of the marks, the sensors may be considered to sense or respond to the decals.

With reference to FIGS. 1 and 2, the brake assembly 42 may be the same as the brake 43 shown in U.S. Pat. No. 3,813,268, and comprises a mounting bracket 76 that is fastened to the mounting plate 12. Secured to the mounting bracket 76 are a stop 77 on one side of the web 20 and a support 78 on the other side of the web. The support 78 carries a solenoid controlled air cylinder 79 including a plunger 81, and a piston or pressure member 82 is secured to the outer end of the plunger 81. The piston or pressure member 82 is generally U-shaped and is movable horizontally as seen in FIG. 1, and the ends of the arms of the U extend across the sides of the support 78 so that the movement of the piston 82 is guided by the support 78. The cylinder 79, when energized, moves the plunger 81 and the piston 82 toward the left and thereby clamps the web 20 tightly between the piston 82 and the stop 77, thereby preventing movement of the web 20. When the cylinder 79 is not energized, the piston 82 is moved toward the right as seen in FIG. 1 away from the web 20 and the web is released, as shown in FIG. 2.

The idler rollers 43 mounted on the arm 44 and the idler rollers 46 mounted on the arm 47 are generally similar to the corresponding rollers and arms illustrated and described in the previously mentioned Kerwin U.S. Pat. No. 3,813,268. In the machine shown in the patent, the arms pivot during operation, but in the present machine the arms are preferably locked in place.

The web transport path is further formed by a pair of guides 91 and 92 which are laterally spaced on opposite sides of the pressure roller 34 and the head 33. The two guides 91 and 92 are curved at their lower ends toward each other and in the direction of the roller 34 as shown in FIG. 1, and the two guides are formed at the lower ends of two plates 93 and 94 which in turn are secured to the lower edge of the mounting plate 12. The lower surfaces of the guides 91 and 92 are approximately at the level of the lower side of the pressure roller 34 when the head 33 is in its upper position, as shown in FIG. 1. The two guides 91 and 92 are, of course, spaced sufficiently far apart that the roller 34 and the head 33 are able to move downwardly between them.

With reference to FIG. 2, when the head 33 is moved downwardly, the pressure roller 34 folds the web 20 downwardly and across a pair of laterally spaced idler rollers 96 and 97. Again, the rollers 96 and 97 are spaced far enough apart to permit the vertical post of the head 33 to move downwardly between them. At its lowermost position, the pressure roller 34 is below the level of the guides 91 and 92 and the level of the idler rollers 96 and 97, and the pressure roller 34 folds the web and presses it against the outer surface 24 of the mug 23. The force of the air cylinder 37 presses the roller 34 tightly against the web 20 and presses the web onto the surface 24, and as shown in FIG. 2, the web makes essentially line contact with the outer surface 24 of the mug 23. The surface of the web which contacts the mug 23 is, of course, the side which carries the decals 21. As previously mentioned, the decals may be heat release decals, and in such event the mugs 23 are preferably preheated before being processed in the machine. Such a heat release decal includes a wax layer that is melted by the head and releases the decal from the web. Consequently, when the pressure roller 34 presses the web and the decal tightly against the heated mug, the decal is transferred from the web to the mug. Thereafter, an additional heating or baking step may take place to permanently fix the decal on the mug. In the case where a label is transferred from the web to the mug, normally the above discussed heating steps are not required.

The construction of the drive roller 48 may be the same as the corresponding drive roller 31 illustrated and described in the above-mentioned Kerwin patent, and the mounting and operation of the pressure roller 49 may also be the same as the pressure roller 32 described in the patent.

As previously mentioned and as described in the Kerwin patent, the take-up spindle 30 has torque applied thereto by a motor to tend to turn the take-up reel 29 during operation of the machine.

As illustrated in FIGS. 1 and 2, the ware or mug 23 is supported below the level of the web 20 and the vertically movable head 33. With specific reference to FIG. 3, the mug 23 is rotatably supported by a mandrel indicated generally by the reference numeral 101. The mandrel 101 comprises a shaft 102 that is rotatably supported by a generally rectangular support part 103 that is mounted closely adjacent the post 11 and underneath the head 33. The part 103 supports a pair of spaced ball bearings 104 which, in turn, support the rearward end portion of the shaft 102. The shaft 102 extends generally horizontally in the foward direction from the support part 103. On the forward end portion of the shaft 102 is secured a tubular sleeve 106, the shaft 102 extending through the center of the sleeve 106 and being secured thereto by a nut 107 on the threaded forward and of the shaft 102. The rearward end of the sleeve 106 engages the inner race of the forward ball bearing 104, and it will be apparent that the sleeve 106 and the shaft 102 are able to rotate freely on the bearings relative to the support part 103 and the frame of the machine. A resilient collar 108 is fastened around the outside of the sleeve 106. An O-ring 111 is fastened in a groove formed in a flange 109 at the rearward end of the sleeve 106, and another O-ring 112 is fastened in a groove formed in the forward face of the sleeve 106.

Means is also preferably provided to form a partial vacuum within the mandrel 101. While various arrangements may be provided for this purpose, in the specific example illustrated in FIG. 3 the vacuum arrangement includes a passage 116 formed substantially on the center line of the shaft 102, the passage 116 extending from the forward end of the shaft to the support part 103. Radial passages are formed through a bearing support wall 100 of the part 103 and through a spacer 105, and a solenoid controlled air valve 118 is connected to the radial passages 117. A tubing 119 connects the valve 118 with a vacuum source (not shown), such as a pump. Thus, a vacuum applied within the passage 116 will appear within the interior of the mug 23 and will be sealed by the O-ring 112. This vacuum, as will be explained hereinafter, is selectively applied at times to hold the mug 23 tightly in place on the mandrel while the decal is being applied.

With reference to FIG. 3, the head 33 includes two spaced apart supports 110. The pressure roller 34 is located between the supports 110 and rotatably mounted thereon by a pin 115. On the rearward side of the head 33, a ring 120 is secured to the outer end of the pin 115 and it rotates with the pin 115 and the roller 34. The ring 120 is aligned with the O-ring 111, and when the head 33 is in its downward position the ring 120 tightly engages the O-ring 111. Thus, the roller 34, the pin 115, the ring 120, the sleeve 106 and the mug 23 all rotate in unison.

The following is a brief summary of the operation of the machine, which will then be described in more detail in connection with FIGS. 7 and 8. At the beginning of a cycle, an operator of the machine positions a mug on the mandrel 101 as shown in FIGS. 1 to 3. Further, the operator locates the handle 25 of the mug 3 adjacent the right-hand guide 95 as shown in FIG. 1. At the beginning of a cycle of operation, the head 33 is in the upper position shown in FIG. 1. The operator then actuates a start switch, which may be an ordinary foot pedal switch, and starts a cycle of operation. The head 33 is moved downwardly by the air cylinder 37 and a partial vacuum is applied within the interior of the mug 23 to hold the mug in place. As the head 33 moves downwardly, the web 20 is folded ahead of the pressure roller 34 as shown in FIG. 2, and the brake 42 is applied to grip the web. The drive roller 48 is continuously powered and exerts a pull on the web which holds it tight under the head 33, but the web to be folded under the roller 34 is pulled backwardly somewhat past the drive roller 48. When the head 33 reaches its lower position shown in FIGS. 2 and 3, the pressure roller 34 presses the web tightly against the outer surface of the mug 23 and then the brake 42 is released. The previously mentioned wax coating on the decal melts due to the heat of the mug producing a relatively slippery interface between the web and the mug. The backside of the web, however, is free of wax, and there is good frictional engagement between the web and the pressure roller 34. The drive roller 48 pulls the web 20 forwardly toward the take-up reel 29 and the pressure exerted by the roller 34 on the web and against the mug 23 is sufficient for the web to turn the pressure roller 34 and to rotate the mug in the clockwise direction as seen in FIGS. 1 and 2, the entire mandrel and the mug, of course, rotating relative to the support part 103. At the start of rotation of the mug, the particular decal associated with the mug is preferably located so that its leading or forward edge is closely adjacent the mug. Then, as the web is pulled forwardly, the length of the decal is rolled and pressed onto the outer surface of the mug as the web moves forwardly and the mug rotates. Further, at the beginning of the decal-applying cycle, one of the dark marks 22 is adjacent the lower photocell 68 of the sensor assembly 41. As the web 20 moves forwardly during the time that a decal is being applied, the mark that was adjacent the lowermost photocell moves downwardly and the next subsequent mark moves to the upper photocell 66. The spacing of the mark 22 is set or adjusted so that at the time the next subsequent mark reaches the uppermost photocell 66, the rearward or trailing end portion of the decal is pressed onto the mug 23. The brake 42 is applied, the head 33 is retracted or moved upwardly to the position shown in FIG. 1, and the vacuum in the mandrel is released. The drive roller 48 and the take-up reel pull up the slack in the web as the head 33 moves upwardly. When the head reaches its upper position, the brake 42 is again released and the web 20 is pulled forwardly by the drive roller until the dark mark that was at the upper cell 66 reaches the lower photocell 68, at which time the brake 42 is again applied. The operator of the machine then removes the mug 23 and replaces it with a fresh mug at the beginning of the next subsequent cycle of operation.

The arrangement whereby the web turns the roller 34 and the roller turns the mandrel and the mug is highly advantageous. The surface speeds of the web 20 and the mug 23 are the same and there is no danger of the decal smearing or warping as it is being applied. This arrangement is also useful where labels rather than decals are transferred from the web to a series of articles.

Figure 7:
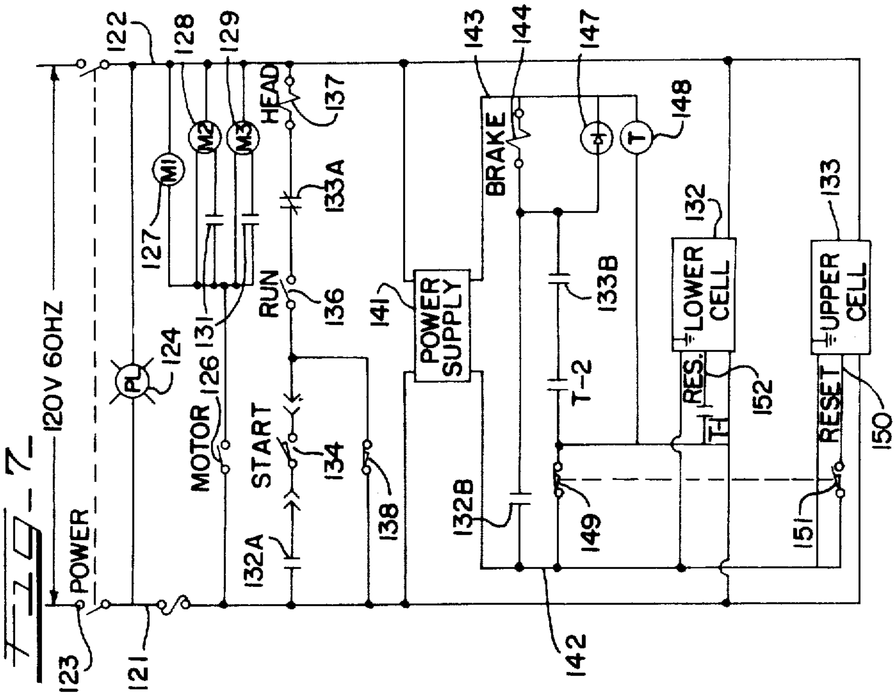
FIG. 7 is a schematic electrical diagram of a control system of the machine.

The control circuit illustrated in FIG. 7 controls the operation of the machine to perform the foregoing series of operations, and the chart shown in FIG. 8 shows the conditions of the switches and circuit parts at various stages in the cycle of operation of the machine. With specific reference to FIG. 7, the control circuit includes two power buses 121 and 122 that are adapted to be connected to an AC power supply by a power switch 123 which is also shown on the panel 13 in FIG. 1. A pilot light 124 shows when the power switch 123 is closed. A manually operated motor start switch 126, also shown on the panel in FIG. 1, connects the AC power to three motors 127, 128, and 129, which are connected to turn the two reel spindles 28 and 30 and the drive roller 48. The two motors 128 and 129 are capacitor 131 start motors and are preferably connected to the take-up reel and to the drive roller 48. The third motor is connected to the feed or supply spindle 28 and tends to turn the spindle 28 in the counter clockwise direction as seen in FIG. 1, and thereby maintains tension in the portion of the web between the supply reel and the brake 42.

Further connected across the power buses 121 and 122 are two logic modules 132 and 133, the module 132 being part of the lower photocell 68 and the module 133 being part of the upper photocell 166. The module 132 controls operation of normally open contacts 132A and 132B, and the other module 133 controls the operation of normally closed contacts 133A and normally open contacts 133B. The two contacts 132A and 133A are connected in series in a line that also includes a start operation switch 134, a run switch 136 (also shown on the panel in FIG. 1) and a solenoid coil 137 that controls operation of the air valve for the head air cylinder 37 and the air valve 118 for the vacuum line connected to the mandrel 101. When the coil 137 is energized, air under pressure is admitted to the head cylinder 37 and the head 33 is moved downwardly, and the valve 118 is opened causing a partial vacuum to appear within the mandrel 101. Connected in parallel with the contacts 132A and the switch 134 is a limit switch 138 which is normally open but is closed when the head 33 is in the down or lower position. The switch 138 is also shown in FIGS. 1 and 2 and, for example, may be mounted on a plate 93 at a position where it will be engaged and actuated by the head 33 when the head is in the down position as shown in FIG. 2.

The control circuit still further includes a power supply 141 having power input terminals or connections to the power buses 121 and 122 and DC output connections leading to control buses 142 and 143. The control circuitry includes the parallel connection of a brake solenoid 144 and a surge protection diode 147. The normally open contacts 132B are connected in series with the above parallel connection and, in addition, another line is connected in parallel with the contacts 132B. This other line includes the contacts 133B, contacts T-2 of a timer 148, and limit switch contacts 149. The limit switch contacts 149 are part of limit switch that is also shown in FIGS. 1 and 2 and which is actuated when the head 33 is in the upper position. The limit switch 149 may also, for example, be mounted on the plate 93. The limit switch 149 includes second contacts 151 which are operated simultaneously with the contacts 149. The contacts 149 are closed and the contacts 151 are open when the head 33 is moved downwardly away from its uppermost position and the opposite condition occurs when the head is up. The contacts 151 are connected to a reset terminal 150 of the logic module 133.

The timer 148 includes the above contacts T-2 and second contacts T-1 which are connected to a reset input 152 of the module 132.

The operation of each of the modules 132 and 133 is such that, when a dark mark is adjacent, for example, the upper photocell 66, the module 133 is set, and the contacts 133A and 133B are in their abnormal positions. The moduel 133 remains in the set mode or condition until a reset signal appears at the reset input 150, and when the module 133 is reset, the two contacts 133A and 133B are moved to their normal positions. The module is then reset until it is set by the next dark mark.

To operate the machine, the operator mounts a reel filled with the web on the supply spindle 28 and threads or runs the web through the sensor assembly 41, the brake 42 past the head 33 and the drive roller 48 and to the take-up reel 29. The operator positions the web 20 such that a dark mark 22 is adjacent the lower photocell 68 and, as a consequence, the leading end of a decal 21 is closely adjacent the pressure roller 34. The operator closes the power switch 23, the motor switch 126 and the run switch 136 and these switches remain closed during the operation of the machine. The operator then places a mug 23 on the mandrel 101 with the handle 25 against the guide 95 as previously explained and then manually closes the start switch 134 to start a cycle of operation. The conditions of the various switches and logic modules at this time are illustrated in the column 156 in FIG. 8 having the caption "Head Up—Start Cycle". A circuit is then completed through the head solenoid 137 and the head is moved downwardly and the partial vacuum is applied to the mandrel. Since the contacts 132B are closed, the brake solenoid 144 is also energized, and the arms 44 and 47 are held stationary and the brake is applied.

The conditions of the parts when the head arrives at the down or lower position is illustrated in the column 157 in FIG. 8. The limit switch contacts 149 and 151 shift or are actuated so that the contacts 149 are closed in order to start the timer 148 and the contacts 151 are opened. The timer 148 has a short timing period of, for example, 0.8 second, and at the end of the 0.8 second period, contacts T-1 and T-2 are closed. The contacts 133B are opened because the module 133 was previously reset. The contacts 132B and 133B being open, the brake solenoid is not energized. The drive roller then pulls the web causing the mug 23 and the roller 34 to rotate as the decal is rolled onto the mug as previously explained. The mark moves downwardly away from the lower photocell 68, but when the next subsequent mark reaches the upper photocell 66, the condition of the control circuit is as shown in the column 158 marked "Head Down—End Application". When this next dark mark reaches the upper photocell 66, the module 133 is set by the mark and the contacts 133B open. The contacts 132B were previously opened because the module 132 was reset by the closure of the timer contacts T-1. Consequently, the brake solenoid is deenergized causing the head 33 to be retracted to the upper position shown in FIG. 1. The drive roller 48, of course, takes up the slack from the fold of the web as the head moves upwardly. When the head arrives at the upper position, the condition of the parts is as illustrated in column 159 in FIG. 8. When the head arrives in the upper position, the limit switch contacts 151 are closed causing the module 133 to be reset, thereby opening the contacts 133B. The brake 144 solenoid is deenergized and the drive roller 48 again advances the web 20 a short distance until the dark mark moves from the upper eye 66 to the lower eye 68. This condition of the parts is shown in column 160 in FIG. 8. When the mark reaches the lower cell 68, this module 132 is is set and the contacts 132B are closed resulting in energization of the brake solenoid 144 and the arms solenoid 146. The brake then holds the web 20 against further movement. The machine is then at the beginning of the next subsequent cycle and the operator removes the mug 23 and replaces it with another heated mug and then starts the next cycle of operation.

While a preferred and specific embodiment of the present invention has been shown and described, it will be apparent that the described embodiment is susceptible to change and modification without departing from the scope of the broader aspects of the invention, and it will therefore be understood that the invention is to be limited only by the scope of the claims. For example, instead of an arrangement wherein two photocells and a single dark mark are provided on the web for each decal, the reverse arrangement may be provided wherein only one photocell is provided and two spaced marks are formed on the web for each decal. In such an arrangement, the difference in operation is that first the leading mark advances or is advanced to the photocell and subsequently the brake is released to permit the second mark to be advanced to the photocell. Of course, the reason for the two separate advances of the web for each cycle of operation is to allow the web to advance as the decal is being applied and then to advance the web a small additional amount in order to properly position the next subsequent decal relative to the mug. The location of the upper photocell is therefore preferably made adjustable so that the machine may be adapted for slightly different length decals and to enable the operator of the machine to obtain proper registration of the decals relative to the mugs. Of course, if only a single size decal is provided and the positions of the marks are precisely fixed, it may not be necessary to make the location of one of the two photocells adjustable.

I claim:

1. A method of transferring a series of decals from an elongated web to a corresponding number of generally cylindrical articles in a machine including web drive means and web pressure means, the decals being substantially regularly spaced on the web, comprising the steps of rotatably mounting an article adjacent the web, activating the web pressure means to press the web against the article, activating said web drive means and thereby rolling a decal onto the article by simultaneously moving the web and rotating the article a distance approximately equal to the length of a decal and then stopping the web movement, inactivating the web pressure means and thereby moving the web away from the article, and then activating the web drive means and thereby moving the web a short distance to locate the next subsequent decal in position to be transferred to a next subsequent article.

2. A method of transferring a decal from an elongated web having a series of spaced decals thereon to an article having a generally cylindrical wall and a generally radial handle on the wall in a machine including web drive means and web pressure means, comprising the steps of activating said web pressure means and pressing the web against the wall at a location that is spaced from the handle, simultaneously moving the activating said web drive means and thereby web and rotating the article to roll the decal onto the wall, said handle being rotated circumferentially away from said location, inactivating said web drive means and stopping said rotation after said decal is transferred to the article and before said handle is rotated to said location, inactivating said web pressure means to release said pressure on said web, and activating said web drive means to move said web a distance equal to the decal spacing.

3. A method of transferring a series of indicia from an elongated web to a plurality of articles having walls that are generally circular in cross section in a machine including web drive means and web pressure means, each indicium having a length and adjacent indicia being separated by a space, comprising the steps of rotatably mounting a selected article adjacent the web and relatively close to the leading end of an indicium, activating said web drive means and thereby pressing the web against the wall of said selected article, rolling said indicia on the wall by rotating said article and moving said web for a distance that is substantially equal to the length of said indicium, inactivating said web drive means and inactivating said web pressure means and releasing said pressure on said web against the wall, activating said web drive means and moving said web a distance that is substantially equal to said space, replacing said selected article with a next article, and repeating the aforesaid steps.

4. A method of operating a machine for transferring a series of indicia from an elongated web to a plurality of articles having walls that are generally cylindrical in cross section, each indicia having a length and adjacent indicia being separated by a space, the machine including movable pressure means for pressing the web against the wall of a selected article, a web drive on one side of the pressure means for pulling the web past the pressure means, and a web brake on the other side of said pressure means, the brake when engaged holding and preventing movement of the web, said method comprising the steps of engaging the brake to hold the web, rotatably positioning a selected article adjacent the web, moving said pressure means to press the web against the wall of the article, disengaging the brake, whereby the web drive moves the web past the article for approximately the length of the decal, the article rotating in synchronism with the web movement, engaging the brake to stop movement of the web, moving said pressure means to remove said pressure of the web against the wall, disengaging the brake to enable the drive to move the web, engaging the brake when the web has moved a distance that is approximately equal to said space between adjacent decals, replacing said selected article with the next article, and repeating the aforesaid steps.

* * * * *